United States Patent
Ide et al.

(10) Patent No.: US 9,098,755 B2
(45) Date of Patent: Aug. 4, 2015

(54) BIOMETRICS AUTHENTICATION APPARATUS, BIOMETRICS AUTHENTICATION SYSTEM, AND BIOMETRICS AUTHENTICATION METHOD

(71) Applicant: FUJITSU FRONTECH LIMITED, Inagi-shi, Tokyo (JP)

(72) Inventors: Katsumi Ide, Inagi (JP); Hideo Kamata, Inagi (JP); Akitaka Minagawa, Inagi (JP); Yasuyuki Higashiura, Inagi (JP); Kentarou Kasugai, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 16 days.

(21) Appl. No.: 14/015,176

(22) Filed: Aug. 30, 2013

(65) Prior Publication Data

US 2014/0016833 A1 Jan. 16, 2014

Related U.S. Application Data

(63) Continuation of application No. PCT/JP2011/057790, filed on Mar. 29, 2011.

(51) Int. Cl.
G06K 9/00 (2006.01)
(52) U.S. Cl.
CPC ........ G06K 9/00885 (2013.01); G06K 9/00926 (2013.01)
(58) Field of Classification Search
None
See application file for complete search history.

(56) References Cited

U.S. PATENT DOCUMENTS 6,311,272 B1 10/2001 Gressel
8,526,682 B2 * 9/2013 Sahin et al. .................. 382/115
(Continued)

FOREIGN PATENT DOCUMENTS

| CN | 1897046 A | 1/2007 |
| CN | 101419730 A | 4/2009 |

(Continued)

OTHER PUBLICATIONS

International Search Report of PCT/JP2011/057790, mailing date of May 10, 2011.
(Continued)

*Primary Examiner* — Stephen R Koziol
*Assistant Examiner* — Sean Conner
(74) *Attorney, Agent, or Firm* — Westerman, Hattori, Daniels & Adrian, LLP

(57) ABSTRACT

A biometrics authentication apparatus acquires biometric information by a biometric information acquisition section and acquires first registered information and second registered information by a registered information acquisition section. The biometrics authentication apparatus generates a comparison score from the first registered information and the biometric information, compares the comparison score and a threshold, and outputs an authentication result, by an authentication section. The biometrics authentication apparatus generates a comparison score for each of combinations of two of the biometric information by which success in authentication is obtained, the first registered information, and the second registered information, evaluates the comparison score, and generates an evaluation result, by a comparison evaluation section. When the biometric information may be good second registered information, the biometrics authentication apparatus treats the biometric information as new second registered information by a replacement section.

8 Claims, 12 Drawing Sheets

(56) References Cited

U.S. PATENT DOCUMENTS

| | | | |
|---|---|---|---|
| 2002/0154793 A1* | 10/2002 | Hillhouse et al. | 382/115 |
| 2004/0086157 A1* | 5/2004 | Sukegawa | 382/115 |
| 2005/0270140 A1* | 12/2005 | Oh | 340/5.83 |
| 2008/0077359 A1* | 3/2008 | Ito | 702/187 |
| 2008/0154929 A1 | 6/2008 | Abe | |
| 2008/0212846 A1* | 9/2008 | Yamamoto et al. | 382/115 |
| 2009/0322894 A1* | 12/2009 | Abe | 348/222.1 |
| 2010/0253471 A1* | 10/2010 | Abe | 340/5.83 |
| 2010/0275258 A1* | 10/2010 | Kamakura | 726/19 |

FOREIGN PATENT DOCUMENTS

| | | |
|---|---|---|
| CN | 101499130 A | 8/2009 |
| JP | 03-142685 A | 6/1991 |
| JP | 11-167632 A | 6/1999 |
| JP | 2006-187387 A | 7/2006 |
| JP | 2008-033810 A | 2/2008 |
| JP | 2008-077518 A | 4/2008 |
| JP | 2008-158592 A | 7/2008 |
| WO | 99/26184 A1 | 5/1999 |

OTHER PUBLICATIONS

Extended European Search Report dated Apr. 1, 2015, issued in corresponding European Application No. 11861922.0. (6 pages).

Office Action dated Apr. 3, 2015, issued in corresponding Chinese Patent Application No. 201180069616.9, w partial English translation. (16 pages).

* cited by examiner

80 COMPARISON EXAMPLE TABLE

| COMPARISON EXAMPLE | COMPARISON SCORE A | COMPARISON SCORE B | COMPARISON SCORE C | REPLACE-MENT |
|---|---|---|---|---|
| 1 | 550 | 1300 | 800 | NO |
| 2 | 550 | 900 | 1500 | YES |
| 3 | 800 | 1300 | 500 | NO |
| 4 | 1500 | 900 | 500 | NO |
| 5 | 800 | 500 | 1500 | YES |
| 6 | 1500 | 500 | 800 | NO |

FIG. 10

BIOMETRICS AUTHENTICATION APPARATUS, BIOMETRICS AUTHENTICATION SYSTEM, AND BIOMETRICS AUTHENTICATION METHOD

CROSS-REFERENCE TO RELATED APPLICATION

This application is a continuation application of international Application PCT/JP2011/057790 filed on Mar. 29, 2011 which designated the U.S., the entire contents of which are incorporated herein by reference.

FIELD

The embodiments discussed herein are related to a biometrics authentication apparatus, a biometrics authentication system, and a biometrics authentication method.

BACKGROUND

A human body has pieces of biometric information by which an individual is identifiable, and several of them are used as information for specifying and authenticating an individual. For example, a fingerprint, a retina or an iris in an eye, a face, a blood vessel, or DNA (DeoxyriboNucleic Acid) is known as biometric information used for authentication.

With recent progress of a biometrics authentication technique, various apparatus for performing individual authentication by recognizing the characteristics of such a living body which is a part of a human body are provided. With biometrics authentication, authentication is performed by comparing biometric information (registered template) acquired at registration time and biometric information acquired at authentication time.

In order to improve the accuracy of authentication by biometric information, it is desirable to acquire biometric information with constant accuracy every time authentication is performed. However, when authentication is performed, a user who is an object of authentication does not always assume a proper posture.

In addition, some biometric information changes with the lapse of time, so the use of some of biometric information registered once results in a decrease in the accuracy of authentication. Accordingly, the following identity specification apparatus is proposed. When biometric information is acquired, reregistration is performed. By doing so, registered biometric information is updated (see, for example, Japanese Laid-open Patent Publication No. 11-167632)

Usually the accuracy of authentication by a biometrics authentication apparatus decreases when proper biometric information fails to be acquired at biometrics authentication time or when the quality of a registered template is not good. A biometrics authentication apparatus recovers a decrease in the accuracy of authentication by retrying to acquire biometric information from a person who is an object of authentication. In many cases, however, it is difficult to correct unconscious habitual operation of a person who is an object of authentication, for example, in the operation of spreading a palm over a sensor unit at the time of palm vein authentication.

Furthermore, when a registered template is acquired, a proper posture is not always assumed. If inadequate biometric information is registered, a biometrics authentication apparatus fails to realize sufficient authentication accuracy at the time of authentication performed later.

Such a decrease in the accuracy of authentication leads to an increase in the number of retries made to acquire biometric information. As a result, such a biometrics authentication apparatus may be hard to use for a person who is an object of authentication.

SUMMARY

According to an aspect of the embodiments to be discussed herein, there is provided a biometrics authentication apparatus which include a biometric information acquisition section which acquires biometric information from a person who is an object of authentication; a registered information acquisition section which acquires first registered information which is the biometric information registered in advance and second registered information which is the biometric information that is used till last authentication and that is registered; an authentication section which generates a comparison score from at least one of the first registered information and the second registered information and the biometric information acquired by the biometric information acquisition section and which authenticates the person who is an object of authentication by comparing the comparison score and a determined threshold; a comparison evaluation section which generates a comparison score for each of combinations of two of the biometric information used this time for authenticating the person who is an object of authentication, the first registered information, and the second registered information and which evaluates the comparison score generated for said each of the combinations; and a replacement section which replaces the second registered information with the biometric information used this time on the basis of an evaluation by the comparison evaluation section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates a comparison example table in the second embodiment;

DESCRIPTION OF EMBODIMENTS

Embodiments will now be described with reference to the drawings.

First Embodiment

Figure 1:
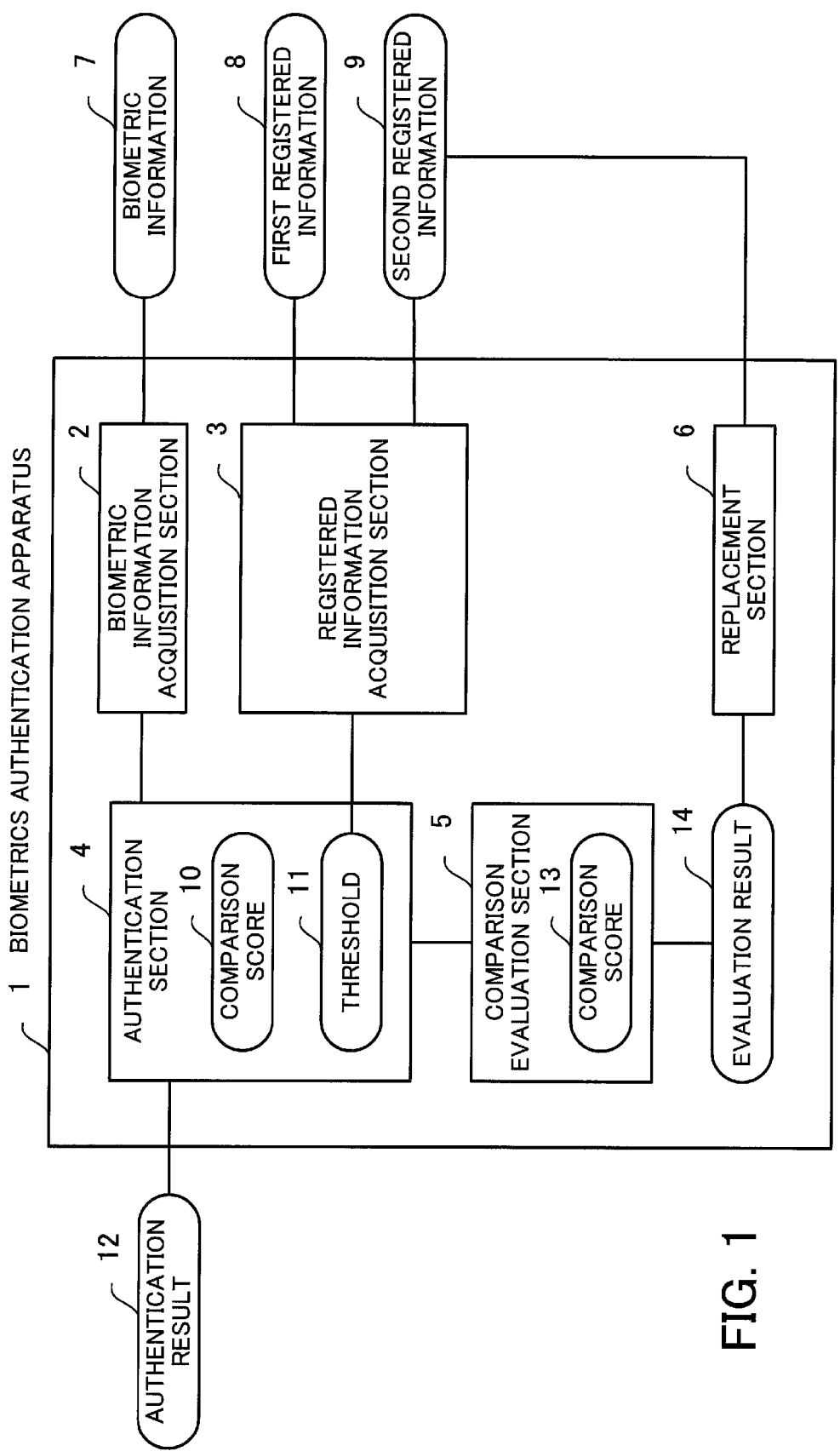
FIG. 1 illustrates the structure of a biometrics authentication apparatus according to a first embodiment.

First a biometrics authentication apparatus according to a first embodiment will be described with reference to FIG. 1. FIG. 1 illustrates the structure of a biometrics authentication apparatus according to a first embodiment.

A biometrics authentication apparatus 1 performs individual authentication by the use of biometric information 7 indicative of characteristics specific to a living body, and outputs an authentication result 12. The biometric information 7 used by the biometrics authentication apparatus 1 is a fingerprint, a face, an iris, or a vein pattern on a body surface, such as a palm or a finger. A part, such as a face, of the biometric information 7 changes with the lapse of time, so the accuracy of authentication may become unstable. In addition, even if the biometric information 7 changes slightly with the lapse of time, conditions under which the biometric information 7 is acquired are not constant. As a result, the accuracy of authentication may become unstable.

The biometrics authentication apparatus 1 regularly or irregularly replaces registered information used for biometrics authentication, that is to say, registered information (registered template) for comparison registered as biometric information for a person himself/herself who is an object of authentication in order to stabilize the accuracy of authentication.

The biometrics authentication apparatus 1 includes a biometric information acquisition section 2, a registered information acquisition section 3, an authentication section 4, a comparison evaluation section 5, and a replacement section 6. The biometric information acquisition section 2 acquires the biometric information 7 from the person who is an object of authentication. The registered information acquisition section 3 acquires first registered information (first registered template) 8 which is the biometric information 7 registered in advance and second registered information (second registered template) 9 which is the biometric information 7 that is used till the last authentication and that is registered.

The first registered information 8 and the second registered information 9 which the registered information acquisition section 3 acquires may be recorded in a record section included in the biometrics authentication apparatus 1 or be recorded in an external device or an external record medium.

The first registered information 8 is biometric information registered in advance as biometric information for the person himself/herself who is an object of authentication. The first registered information 8 is not to be replaced with the biometric information 7. The second registered information 9 is biometric information registered at successful authentication time under determined conditions as biometric information for the person himself/herself who is an object of authentication. The second registered information 9 is to be replaced with the biometric information 7. The first registered information 8 and the second registered information 9 need only be characteristic information by which the person himself/herself who is an object of authentication is identifiable, and may not be biometric information (image data, for example) acquired at registration time. That is to say, the first registered information 8 and the second registered information 9 may be processed information (processed data).

The authentication section 4 generates a comparison score 10 from the first registered information 8 and the biometric information 7. The authentication section 4 calculates a degree of similarity between characteristic information included in the first registered information 8 and characteristic information included in the biometric information 7 as the comparison score 10 by a determined calculation method. The authentication section 4 compares the calculated comparison score 10 and a threshold 11 and outputs an authentication result 12.

The authentication section 4 compares the comparison score 10 and the threshold 11. If authentication reference is met, then the authentication section 4 outputs the authentication result 12 of success in authentication. If the authentication reference is not met, then the authentication section 4 generates the comparison score 10 from the second registered information 9 and the biometric information 7. The authentication section 4 calculates a degree of similarity between characteristic information included in the second registered information 9 and the characteristic information included in the biometric information 7 as the comparison score 10 by the determined calculation method. The authentication section 4 compares the calculated comparison score 10 and the threshold 11 and outputs the authentication result 12. The authentication section 4 compares the comparison score 10 and the threshold 11. If the authentication reference is met, then the authentication section 4 outputs the authentication result 12 of success in authentication. If the authentication reference is not met, then the authentication section 4 outputs the authentication result 12 of failure in authentication.

In the above description the authentication section 4 makes a comparison between the biometric information 7 and the first registered information 8 or the second registered information 9 in that order. However, the authentication section 4 may reverse that order.

The comparison evaluation section 5 generates a comparison score 13 for each of combinations of two of the biometric information 7 which is used this time and by which success in authentication of the person that is an object of authentication is obtained, the first registered information 8, and the second registered information 9. That is to say, the comparison evaluation section 5 generates a first comparison score from the biometric information 7 used this time and the first registered information 8, generates a second comparison score from the biometric information 7 used this time and the second registered information 9, and generates a third comparison score from the first registered information 8 and the second registered information 9. The comparison scores 13 for the combinations include the first comparison score, the second comparison score, and the third comparison score.

The comparison evaluation section 5 evaluates the generated comparison scores 13 for the combinations and generates an evaluation result 14. The calculation algorithm by which the authentication section 4 calculates the comparison score 10 and a generation algorithm by which the comparison evaluation section 5 generates the comparison scores 13 for the combinations may be the same or different from each other.

If the replacement section 6 determines on the basis of the evaluation result 14 that the replacement of the second registered information 9 by the biometric information 7 is proper, that is to say, if the biometric information 7 may become good second registered information 9, then the replacement section 6 treats the biometric information 7 used this time as new second registered information 9.

As has been described, the biometrics authentication apparatus 1 replaces the second registered information 9 with more proper biometric information 7. As a result, the accuracy of authentication is improved in an authentication process. Furthermore, the improvement of the accuracy of authentication reduces the number of retries made to acquire biometric information, and improves the convenience at authentication time of a person who is an object of authentication.

Second Embodiment

Figure 2:
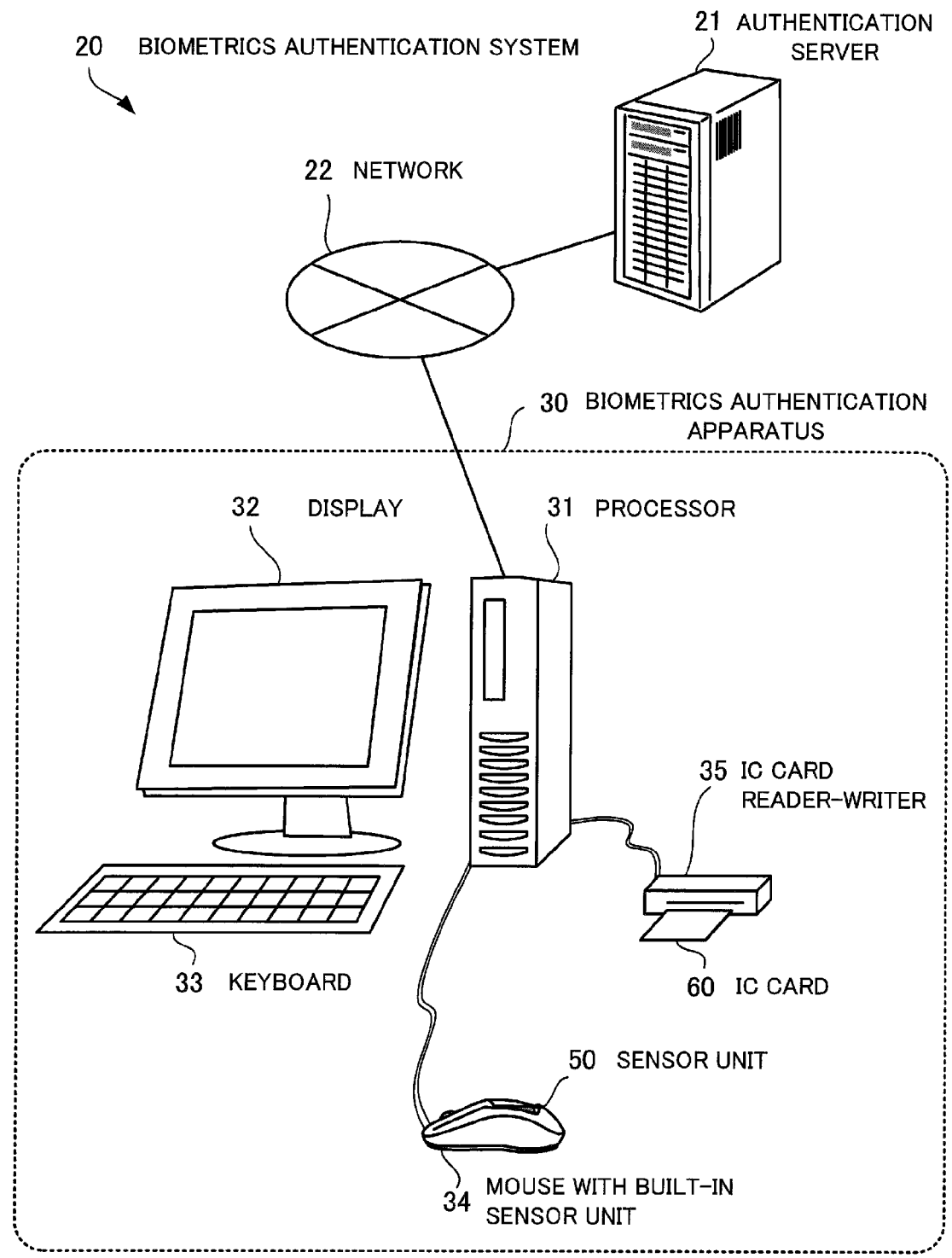
FIG. 2 illustrates the structure of a biometrics authentication system according to a second embodiment.

A more concrete description will now be given by the use of a second embodiment. FIG. 2 illustrates the structure of a biometrics authentication system according to a second embodiment. A biometrics authentication system 20 which performs authentication by the use of palm veins is taken as a second embodiment. However, the same applies to a system which performs authentication by detecting the characteristics of another part of a living body.

A biometrics authentication system 20 is one of systems which recognize the characteristics of a living body, which specify an individual, and which perform authentication. For example, the biometrics authentication system 20 performs customer authentication in a banking system. The biometrics authentication system 20 includes a biometrics authentication apparatus 30, an authentication server 21, and a network 22. The biometrics authentication apparatus 30 is used in an information processing system, an ATM (Automated Teller Machine) in a financial institution, an access control system, or the like for confirming an identity.

The biometrics authentication apparatus 30 compares a registered template registered in advance and biometric information acquired by the biometrics authentication apparatus 30 and performs authentication. The registered template is a first registered template registered in advance or a second registered template to be updated in an authentication process. If the biometrics authentication apparatus 30 succeeds in making a comparison by the use of one of them, then an identity is confirmed.

The biometrics authentication apparatus 30 includes a processor 31, a display 32, and a mouse with a built-in sensor unit 34. In addition, the biometrics authentication apparatus 30 includes a keyboard 33, an IC (Integrated Circuit) card reader-writer 35, and the like at need. The mouse with a built-in sensor unit 34 functions as a mouse which accepts input operation, and contains a sensor unit 50 which captures an image of palm veins. The sensor unit 50 contains an imaging device, captures an image of veins in a user's palm, and outputs the captured image to the processor 31. The IC card reader-writer 35 reads information from or writes information to an IC card 60 of the user. The keyboard 33 and the mouse with a built-in sensor unit 34 accept input operation.

Comparison operation in palm vein authentication performed by the biometrics authentication apparatus 30 will now be described. A user who requests authentication inputs identification information (such as user ID) for identifying the user by the use of the keyboard 33, the mouse with a built-in sensor unit 34, or the IC card reader-writer 35. The biometrics authentication apparatus 30 informs the user of an authentication procedure by display on the display 32 and requests the user to input biometric information for authentication. The user inputs biometric information by spreading the user's hand over the mouse with a built-in sensor unit 34. The biometrics authentication apparatus 30 to which an image of palm veins is inputted as biometric information compares the inputted biometric information and a registered template. The registered template is acquired from a storage unit of the processor 31, a storage unit of the authentication server 21 connected thereto via the network, or a storage unit of the IC card 60 of the user.

For example, if the biometrics authentication apparatus 30 is for personal use, then the biometrics authentication apparatus 30 may acquire the registered template from the storage unit of the processor 31 or the storage unit of the IC card 60 of the user.

The authentication server 21 associates identification information for identifying an individual with comparison information (registered template) registered before biometrics authentication, and stores them. The identification information for identifying an individual is unique ID (IDentification) given directly (such as a user number) or indirectly (such as an account number) to the user. The comparison information registered in advance is characteristic information obtained by extracting a characteristic portion from image information in accordance with a determined characteristic extraction algorithm, the image information, coded information obtained by coding the characteristic information, or the like.

Figure 3:
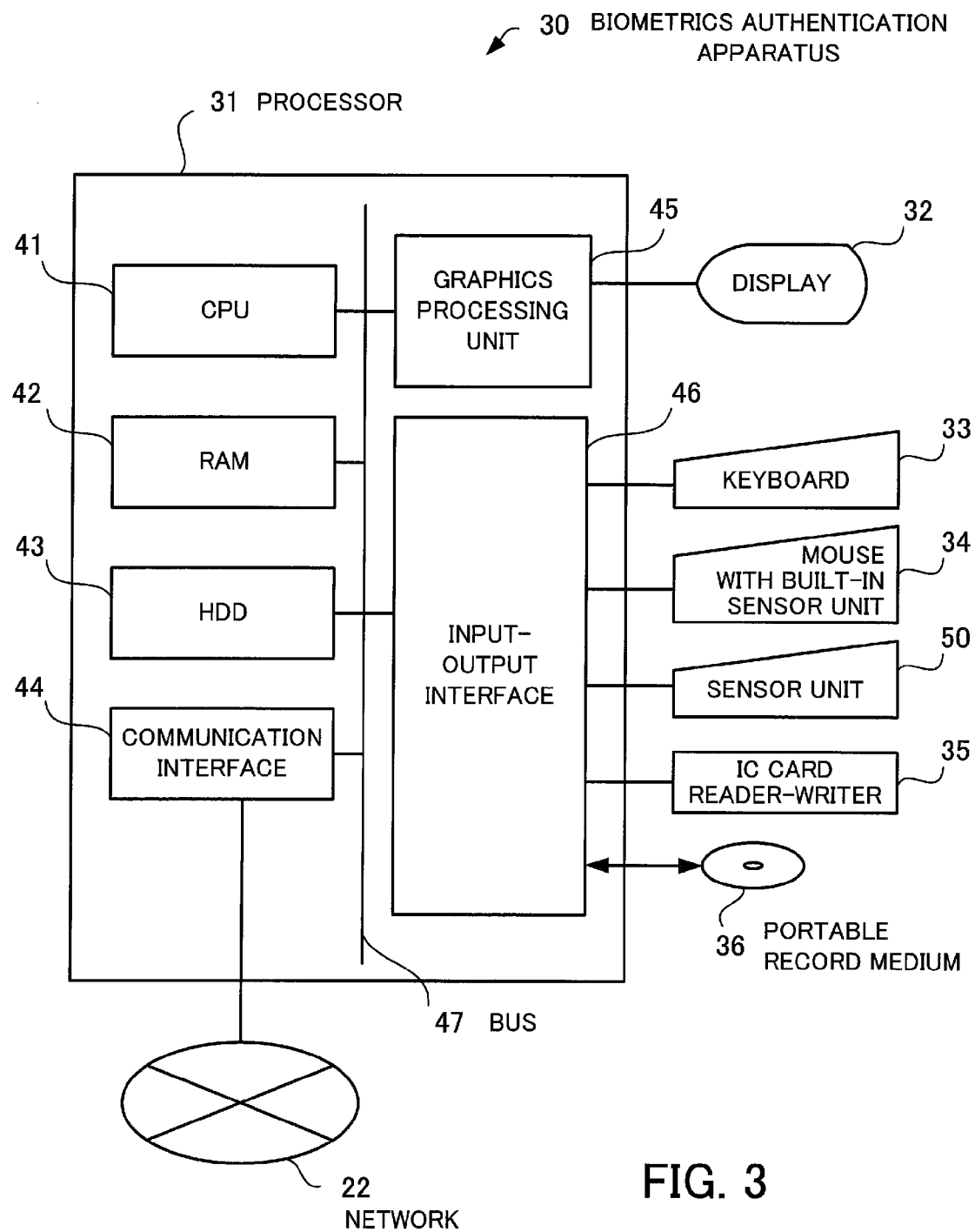
FIG. 3 is an example of a hardware configuration of a biometrics authentication apparatus in the second embodiment.

An example of a hardware configuration of the biometrics authentication apparatus 30 in the second embodiment will now be described with reference to FIG. 3. FIG. 3 is an example of a hardware configuration of the biometrics authentication apparatus in the second embodiment.

The biometrics authentication apparatus 30 includes the processor 31, the display 32, the keyboard 33, the mouse with a built-in sensor unit 34, the sensor unit 50, and the IC card reader-writer 35.

The whole of the processor 31 is controlled by a CPU (Central Processing Unit) 41. A RAM (Random Access Memory) 42, an HOD (Hard Disk Drive) 43, a communication interface 44, a graphics processing unit 45, and an input-output interface 46 are connected to the CPU 41 via a bus 47.

The RAM 42 temporarily stores at least a part of an OS (Operating System) or an application program executed by the CPU 41. The RAM 42 also stores various pieces of data which the CPU 41 needs to perform a process. The HDD 43 stores the OS and application programs.

The display 32 is connected to the graphics processing unit 45. In accordance with instructions from the CPU 41, the graphics processing unit 45 displays an image on a screen of the display 32.

The keyboard 33, the mouse with a built-in sensor unit 34, the sensor unit 50, and the IC card reader-writer 35 are connected to the input-output interface 46. Furthermore, the input-output interface 46 may be connected to a portable record medium interface which writes information to and reads out information from a portable record medium 36. The input-output interface 46 transmits a signal transmitted from the keyboard 33, the mouse with a built-in sensor unit 34, the sensor unit 50, the IC card reader-writer 35, or the portable record medium interface to the CPU 41 via the bus 47.

The communication interface 44 is connected to the network 22. The communication interface 44 exchanges data with another computer (such as the authentication server 21).

By adopting the above-mentioned hardware configuration, processing functions in this embodiment are realized. The authentication server 21 is also realized by the same hardware configuration.

The processor 32 may include not the CPU 41, but a module including an FPGA (Field Programmable Gate Array), a module including a DSP (Digital Signal Processor), and the like. In that case, the processor 31 includes a nonvolatile memory (such as an EEPROM (Electrically Erasable and Programmable Read Only Memory), a flash memory, or a flash memory type memory card) to store firmware of each module. Firmware may be written to a nonvolatile memory via the portable record medium interface or the communication interface 44. The processor 31 performs firmware update by rewriting firmware stored in a nonvolatile memory in this way.

Figure 4:
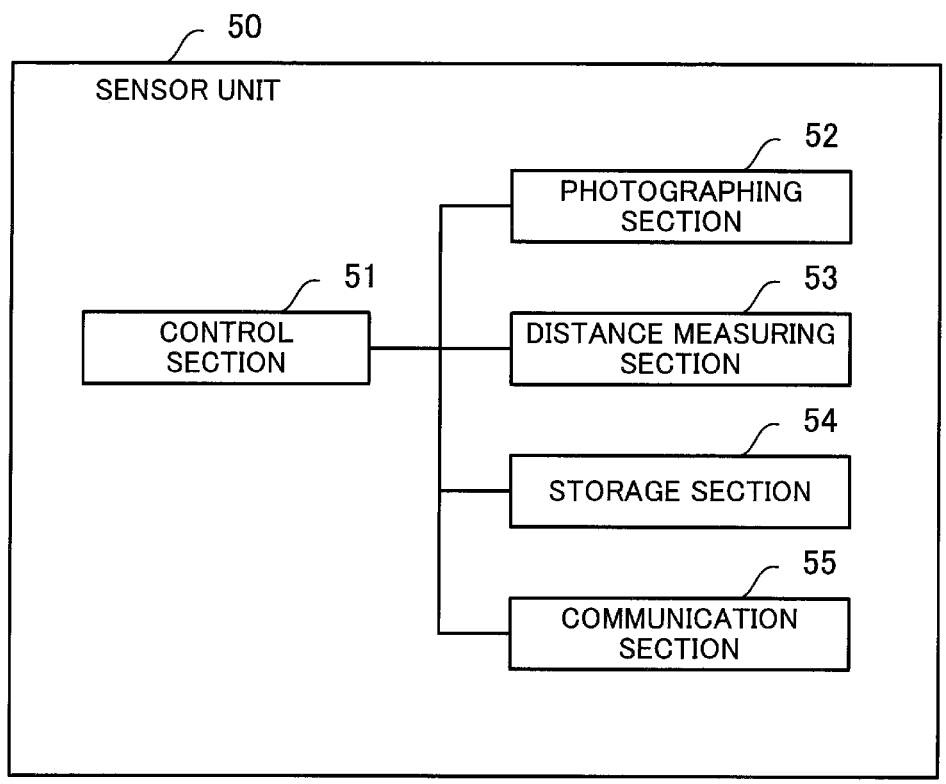
FIG. 4 illustrates the structure of a sensor unit in the second embodiment.

The sensor unit 50 included in the mouse with a built-in sensor unit 34 will now be described with reference to FIG. 4. FIG. 4 illustrates the structure of the sensor unit in the second embodiment.

The sensor unit 50 is attached in a portion of the mouse with a built-in sensor unit 34 over which a palm is put at the time of the operation of the mouse with a built-in sensor unit 34. The sensor unit 50 contactlessly photographs a palm spread over the mouse with a built-in sensor unit 34 to acquire an image of palm veins.

The sensor unit 50 includes a control section 51, a photographing section 52, a distance measuring section 53, a storage section 54, and a communication section 55.

The control section 51 controls each processing section. The photographing section 52 photographs a living body, which is a subject, to acquire image information. The photographing section 52 includes an image sensor (such as a CMOS (Complementary Metal Oxide Semiconductor) sensor or a CCD (Charge Coupled Device) sensor) for photographing a living body, a converging lens, and a plurality of near infrared light emitting devices (such as LEDs (Light Emitting Diodes)) for irradiating a subject with near infrared rays. The near infrared light emitting devices are arranged, for example, around the image sensor and emit near infrared rays in the direction of the subject (upward). The image sensor photographs the subject irradiated with near infrared rays. The photographing section 52 is able to continuously photograph the subject, and photographs the subject, for example, at a photographing speed of 15 frames per second. It may be possible to change a photographing speed by setting. In addition, photographing timing may depend not on time but on the distance to the subject based on an output from the distance measuring section 53. The structure of the photographing section 52 is suitable for photographing palm veins. If another living body, such as an iris, is to be photographed, a structure suitable for a subject is adopted.

The distance measuring section 53 acquires information regarding the distance to a living body, which is a subject. The storage section 54 associates distance information acquired by the distance measuring section 53 with image information acquired by the photographing section 52, and stores them. The distance measuring section 53 is able to not only measure the distance to one portion of a subject but also measure the distances to a plurality of portions of the subject at the same time. The communication section 55 is connected to the processor 31 so that it will communicate with the processor 31. The communication section 55 receives instructions from the processor 31 or transmits image information or distance information to the processor 31.

An image captured by the sensor unit 50 is acquired by irradiating a living body (palm), which is a subject, with near infrared rays and receiving reflected light. Hemoglobin in each red blood cell which runs through veins has lost oxygen, so this hemoglobin (deoxyhemoglobin) has the property of absorbing near infrared rays with a wavelength of about 700 to 1000 nm. Accordingly, when a palm is irradiated with near infrared rays, the intensity of light reflected from vein portions is low. As a result, the positions of veins are recognized on the basis of whether the intensity of light reflected is high or low. Characteristic information is easily extracted by the use of a specific light source, but a captured image is an image in achromatic color.

Figure 5:
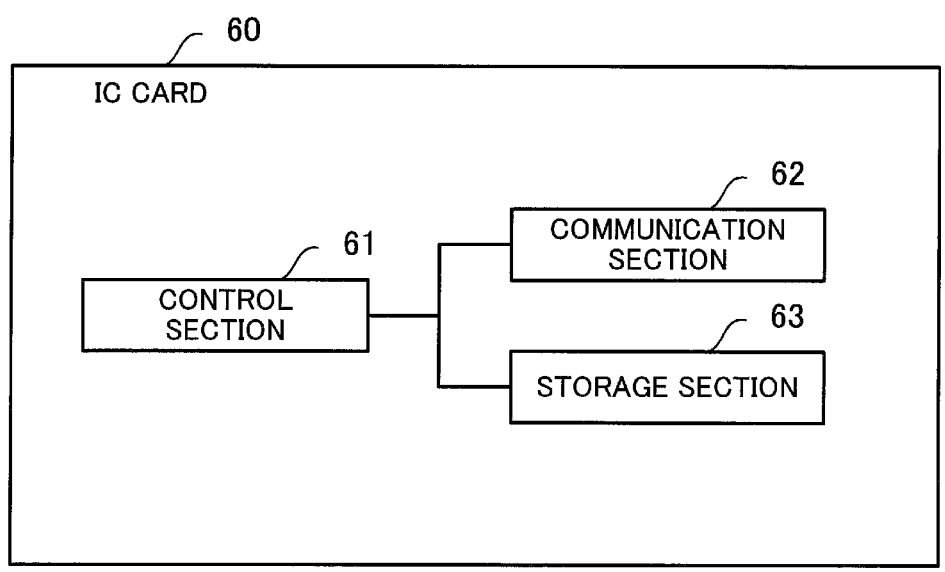
FIG. 5 illustrates the structure of an IC card in the second embodiment.
Figure 6:
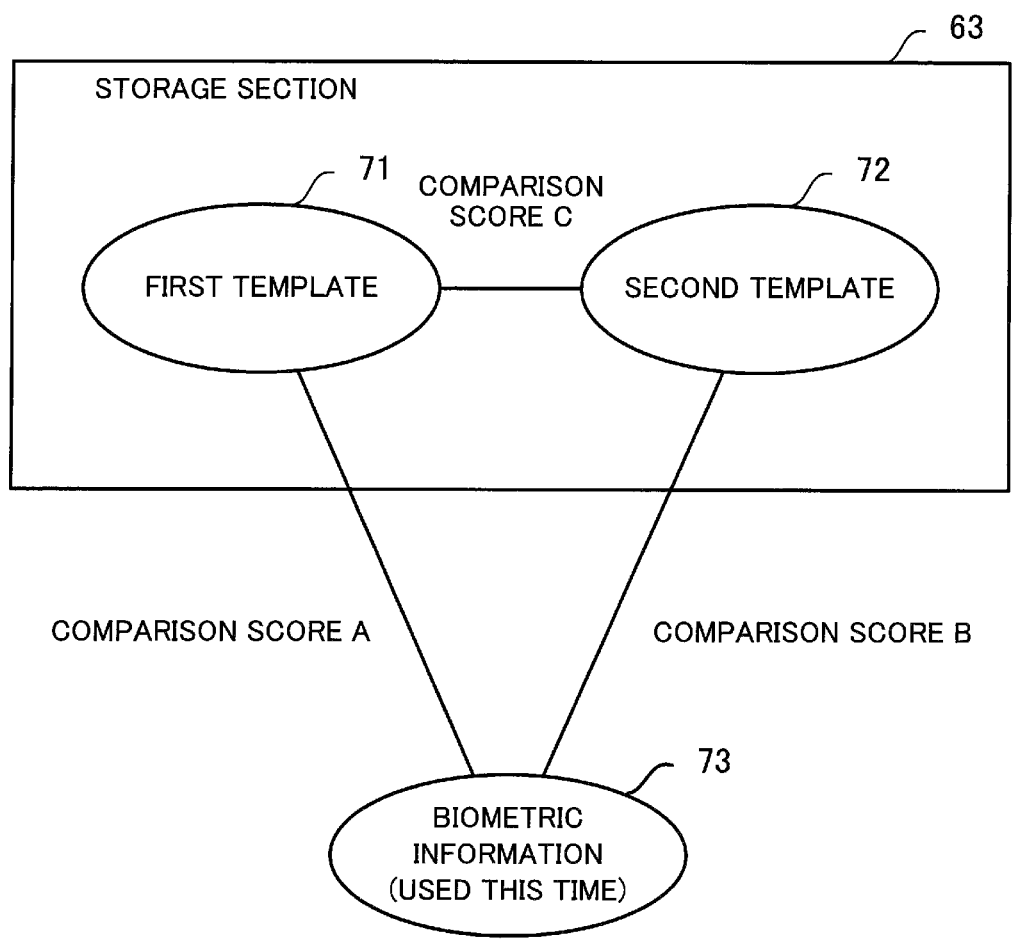
FIG. 6 illustrates relationships among comparison scores in the second embodiment.

The IC card 60 which stores a registered template will now be described with reference to FIGS. 5 and 6. FIG. 5 illustrates the structure of the IC card in the second embodiment. FIG. 6 illustrates relationships among comparison scores in the second embodiment.

The IC card 60 is possessed by a person who is an object of authentication. In order to confirm an identity, the IC card 60 is inserted into the IC card reader-writer 35 and is used. The IC card 60 includes a control section 61, a communication section 62, and a storage section 63. The control section 61 controls each processing section. The communication section 62 performs contactless communication with the IC card reader-writer 35. However, the communication section 62 may perform contact communication with the IC card reader-writer 35.

The storage section 63 stores a first template 71 and a second template 72 acquired by the processor 31. If the first template 71 is registered once, it is not updated. However, the second template 72 is updated to biometric information by which success in authentication is achieved under determined conditions. If an available period is set for the IC card 60, then the first template 71 may be updated at the time of the renewal of the available period.

When the control section 61 reads out the first template 71 and the second template 72 stored in the storage section 63, the control section 61 may pass, in response to a request from the processor 31, them to the processor 31 after processing. Furthermore, the control section 61 may undertake a part of a comparison process to be performed by the processor 31.

The description of the IC card 60 has been given. However, the same applies to a case where the authentication server 21 stores registered templates (first template 71 and the second template 72).

Update of the second template 72 will now be described briefly. If the processor 31 succeeds in authentication by biometric information (used this time) 73, then the processor 31 generates comparison score A for the first template 71 and the biometric information (used this time) 73, comparison score B for the second template 72 and the biometric information (used this time) 73, and comparison score C for the first template 71 and the second template 72. If the comparison score A or B to which the biometric information (used this time) 73 relates is not the poorest, then the processor 31 replaces the second template 72 with the biometric information (used this time) 73. That is to say, the processor 31 updates the second template 72 to the biometric information (used this time) 73. The biometric information (used this time) 73 is acquired by the biometrics authentication apparatus 30 for performing authentication.

As a result, even if the biometrics authentication apparatus 30 fails in authentication by the first template 71, the biometrics authentication apparatus 30 performs authentication by the second template 72. By doing so, an authentication rate is improved. The second template 72 is updated at any time. Accordingly, even if a determined inclination appears in acquired biometric information through repetition of authentication, the biometrics authentication apparatus 30 improves an authentication rate. For example, it is assumed that the operation of spreading a hand is performed in palm vein authentication by a person who is an object of authentication. When the first template 71 is registered, the five fingers are stretched. However, the person who is an object of authentication may have unconsciously acquired a habit at authentication time. This may lead to a decrease in authentication rate. Even in such a case, the biometrics authentication apparatus 30 updates the second template 72 to follow the habit of the person who is an object of authentication and improve an authentication rate. The biometrics authentication apparatus 30 follows not only the habit of the person who is an object of authentication but also a secular change of living body to improve an authentication rate.

Figure 7:
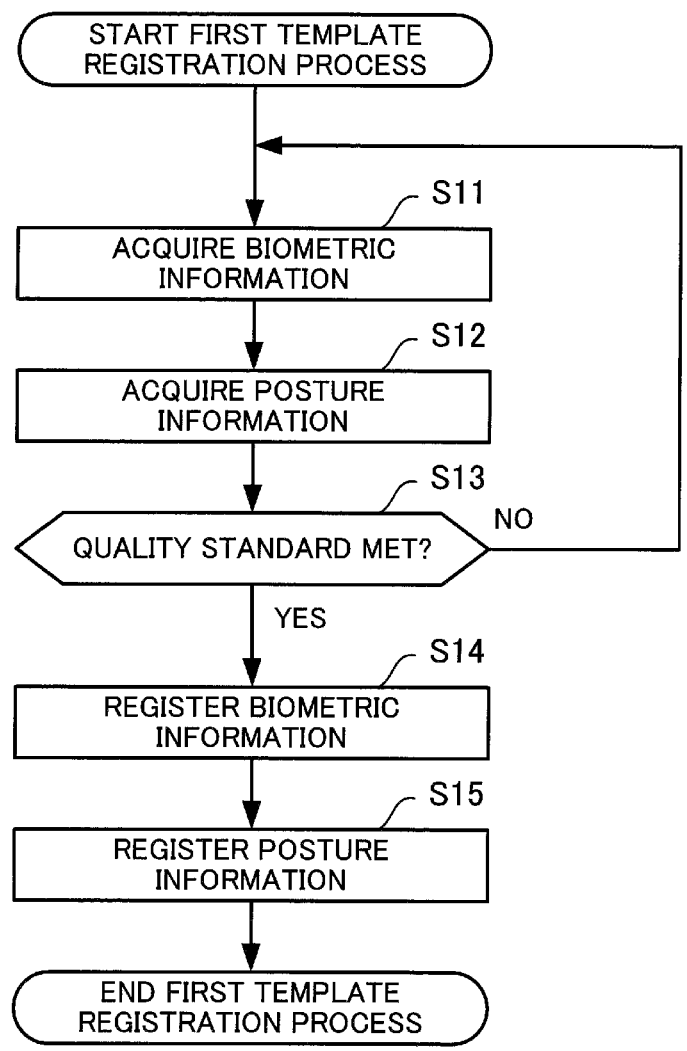
FIG. 7 is a flow chart of a first template registration process in the second embodiment.

A first template registration process in the second embodiment will now be described in detail with reference to FIG. 7. FIG. 7 is a flow chart of a first template registration process in the second embodiment.

A first template registration process is performed by the biometrics authentication apparatus 30 or a template registration apparatus (not illustrated). A first template registration process is performed before authentication for acquiring biometric information from a person himself/herself who is an object of authentication and registering it for comparison. The template registration apparatus is realized by the same structure that is adopted in the biometrics authentication apparatus 30.

(Step S11) The processor 31 requests the sensor unit 50 to provide a captured image of palm veins (biometric information) used for registering a first template. The sensor unit 50 passes a captured image of a palm to the processor 31. The processor 31 acquires the captured image of the palm from the sensor unit 50.

(Step S12) The processor 31 acquires posture information corresponding to the acquired biometric information. The posture information is information which indicates a posture of a living body and which is usable for evaluating a deviation of the living body from a correct position at the time of acquiring the biometric information.

For example, the processor 31 extracts a palm region from the acquired image information (biometric information) by, for example, binarizing the image information and performing contour extraction based on morphology. The processor 31 calculates a distance value for each pixel from a brightness value of each pixel in the palm region of the captured image by the use of the relationship between brightness and distance. The processor 31 calculates palm posture information based on plane approximation. On the basis of a distance value for each pixel, the processor 31 calculates tilt angles in the horizontal and vertical directions of an approximate plane as posture information. By doing so, the processor 31 is able to acquire posture information corresponding to the acquired biometric information.

(Step S13) The processor 31 determines whether or not the tilt angles in the horizontal and vertical directions of the approximate plane, which are the acquired posture information, meet a determined quality standard. For example, if the tilt angles in the horizontal and vertical directions of the approximate plane are within the range of −15 to +15 degrees, then the processor 31 determines that the quality standard is met. If the tilt angles in the horizontal and vertical directions of the approximate plane are not within the range of −15 to +15 degrees, then the processor 31 determines that the posture information does not meet the quality standard. The determined quality standard may include distance and a condition of deformation (palm is not in a flat state, for example) in addition to tilt angles.

If the processor 31 determines that the acquired posture information meets the determined quality standard, then the processor 31 proceeds to step S14. On the other hand, if the processor 31 determines that the acquired posture information does not meet the determined quality standard, then the processor 31 proceeds to step S11.

(Step S14) The processor 31 registers the acquired image information (biometric information) as the first template 71.

(Step S15) The processor 31 registers the calculated posture information as posture information corresponding to the first template 71, and ends the first template registration process.

The first template 71 is registered in this way by the biometrics authentication apparatus 30 or the template registration apparatus (not illustrated). Furthermore, the first template 71 is stored in the storage section 63 of the IC card 60, the HDD 43 of the processor 31, or a storage section of the authentication server 21.

Figure 8:
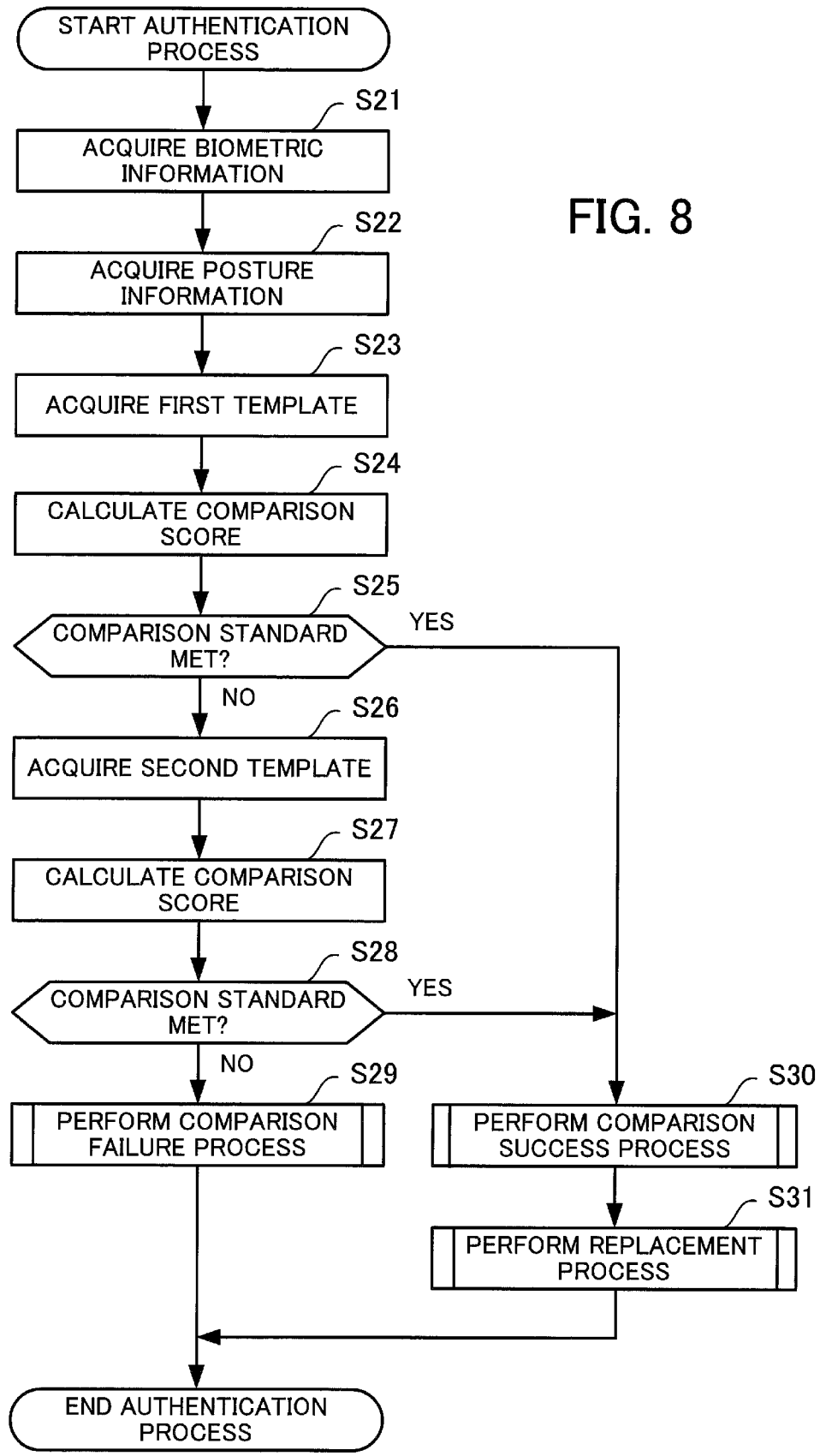
FIG. 8 is a flow chart of an authentication process in the second embodiment.

An authentication process in the second embodiment will now be described in detail with reference to FIG. 8. FIG. 8 is a flow chart of an authentication process in the second embodiment.

An authentication process is performed by the biometrics authentication apparatus 30. In an authentication process, the biometrics authentication apparatus 30 acquires biometric information from a person who is an object of authentication, compares it with a registered template registered in advance, and performs a process according to a comparison result.

(Step S21) The processor 31 requests the sensor unit 50 to provide a captured image of palm veins (biometric information) used for authentication. The sensor unit 50 passes a captured image of a palm to the processor 31. The processor 31 acquires the captured image of the palm (biometric information (used this time) 73) from the sensor unit 50.

(Step S22) The processor 31 acquires posture information corresponding to the acquired biometric information (used this time) 73. The processor 31 acquires the posture information in the same way that is described in step S12.

(Step S23) The processor 31 acquires the first template 71 from the storage section 63 of the IC card 60.

(Step S24) The processor 31 calculates a comparison score from the first template 71 and the biometric information (used this time) 73. A comparison score is an index for evaluating a degree of similarity between the first template 71 and the biometric information (used this time) 73. A smaller comparison score indicates a greater similarity between them. A comparison score is derived by a determined method from a degree of similarity between the first template 71 and the biometric information (used this time) 73. Various known methods are used.

(Step S25) The processor 31 determines whether or not the comparison score calculated from the first template 71 and the biometric information (used this time) 73 meets a determined comparison standard. If the comparison score meets the determined comparison standard, then the processor 31 proceeds to step S30. If the comparison score does not meet the determined comparison standard, then the processor 31 proceeds to step S26.

(Step S26) The processor 31 acquires the second template 72 from the storage section 63 of the IC card 60.

(Step S27) The processor 31 calculates a comparison score from the second template 72 and the biometric information (used this time) 73. A comparison score is an index for evaluating a degree of similarity between the second template 72 and the biometric information (used this time) 73. A smaller comparison score indicates a greater similarity between them. A comparison score is derived by a determined method from a degree of similarity between the second template 72 and the biometric information (used this time) 73. Various known methods are used.

(Step S28) The processor 31 determines whether or not the comparison score calculated from the second template 72 and the biometric information (used this time) 73 meets the determined comparison standard. If the comparison score meets the determined comparison standard, then the processor 31 proceeds to step S30. If the comparison score does not meet the determined comparison standard, then the processor 31 proceeds to step S29.

(Step S29) On the basis of the result of comparison mismatch, the processor 31 determines that an identity is not confirmed, and performs a needed comparison failure process involved in failure in authentication. After that, the processor 31 ends the authentication process.

(Step S30) On the basis of the result of comparison match, the processor 31 determines that an identity is confirmed, and performs a needed comparison success process involved in success in authentication.

(Step S31) The processor 31 performs a replacement process for replacing the second template 72 with the biometric information (used this time) 73 by which the result of comparison match is obtained. After that, the processor 31 ends the authentication process. If it is not proper to replace the second template 72 with the biometric information (used this time) 73 by a replacement process, then the processor 31 does not perform a replacement process. A replacement process will be described later in detail with reference to FIGS. 9 and 10.

As has been described, the biometrics authentication apparatus 30 makes a comparison between the biometric information (used this time) 73 and the first template 71 or a comparison between the biometric information (used this time) 73 and the second template 72 and determines whether or not a comparison score calculated meets the comparison standard. By doing so, the biometrics authentication apparatus 30 performs authentication. In addition, it is expected that each time authentication is performed, the second template 72 will be updated to a better second template 72 by replacing the second template 72 with the biometric information (used this time) 73. Accordingly, it is also expected that the accuracy of authentication will be improved.

In the above description the biometrics authentication apparatus 30 makes a comparison between the first template 71 and the biometric information (used this time) 73 and a comparison between the second template 72 and the biometric information (used this time) 73 in that order. However, the biometrics authentication apparatus 30 may make a comparison in the reverse order. If the biometrics authentication apparatus 30 first makes a comparison between the first template 71 and the biometric information (used this time) 73, then the biometrics authentication apparatus 30 is able to evaluate the number of times it fails in making a comparison between the first template 71 and the biometric information (used this time) 73 or a failure rate of a comparison between the first template 71 and the biometric information (used this time) 73 every time it performs authentication. If an evaluation result is poor, then the biometrics authentication apparatus 30 may demand reregistration of the first template 71.

Furthermore, if the biometrics authentication apparatus 30 first makes a comparison between the second template 72 and the biometric information (used this time) 73, then it is expected that the second template 72 will be better at this point of time than the first template 71. Accordingly, it is expected that the probability of success in authentication being obtained by making a comparison once will increase.

The first template 71 may be registered as an initial value of the second template 72 at first authentication time. The biometric information (used this time) 73 by which first success in authentication is obtained may be registered as an initial value of the second template 72.

Figure 9:
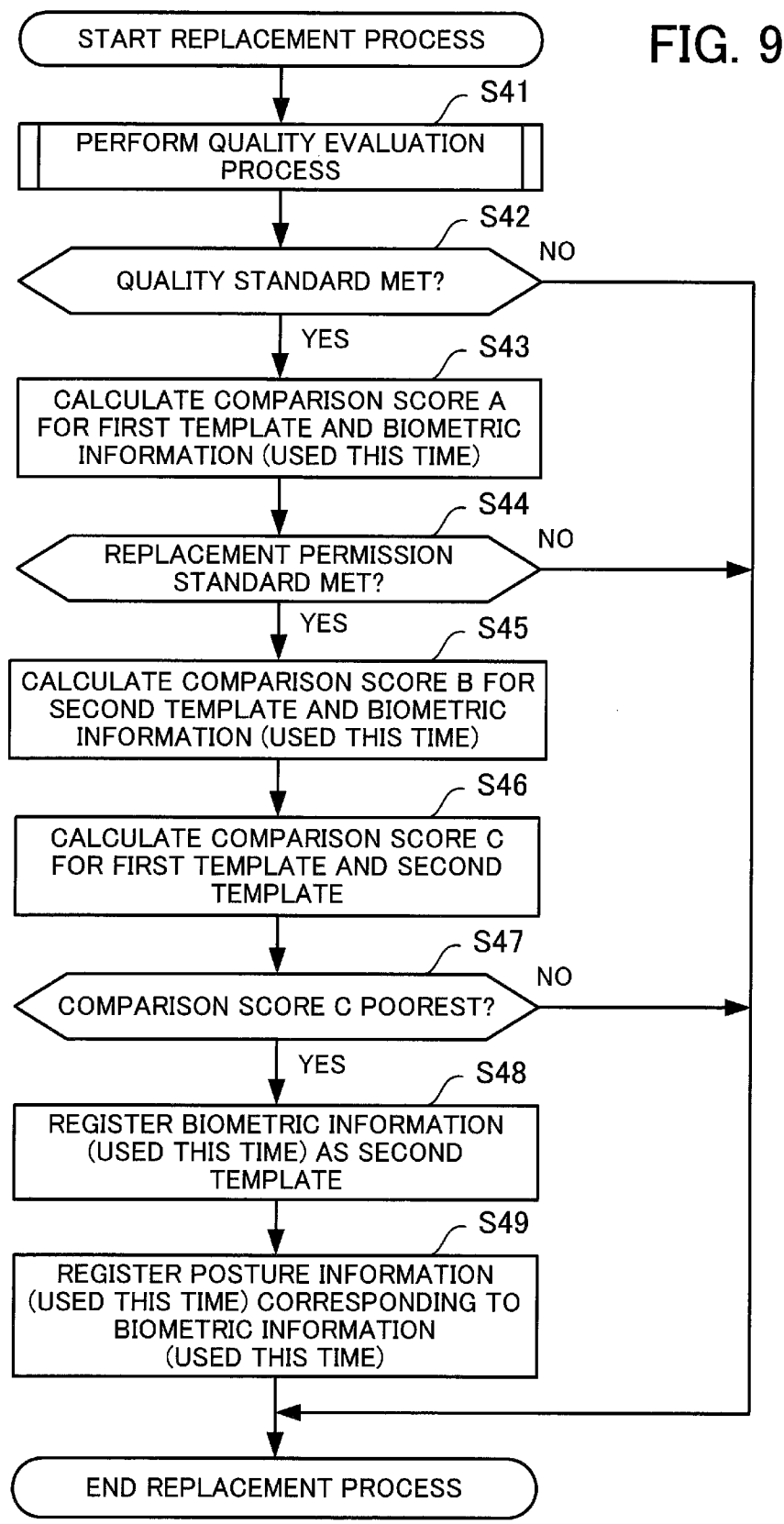
FIG. 9 is a flow chart of a replacement process in the second embodiment.

The replacement process in the second embodiment will now be described in detail with reference to FIGS. 9 and 10. FIG. 9 is a flow chart of the replacement process in the second embodiment. FIG. 10 illustrates a comparison example table in the second embodiment.

The replacement process is performed by the biometrics authentication apparatus 30. If it is proper to replace the second template 72 with the biometric information (used this time) 73, then the replacement of the second template 72 by the biometric information (used this time) 73 is performed by the replacement process.

(Step S41) The processor 31 performs a quality evaluation process for evaluating the quality of the biometric information (used this time) 73 by which the result of comparison match is obtained. The quality evaluation process will be described later in detail with reference to FIG. 11.

(Step S42) The processor 31 determines whether or not a result obtained by evaluating the quality of the biometric information (used this time) 73 meets a determined quality standard. If a result obtained by evaluating the quality of the biometric information (used this time) 73 meets the determined quality standard, then the processor 31 proceeds to step S43. If a result obtained by evaluating the quality of the biometric information (used this time) 73 does not meet the determined quality standard, then the processor 31 ends the replacement process. As a result, the second template 72 is not replaced with the biometric information (used this time) 73 not having certain quality.

(Step S43) The processor 31 calculates the comparison score A for the first template 71 and the biometric information (used this time) 73.

(Step S44) The processor 31 determines whether or not the comparison score A meets a replacement permission standard. If the comparison score A meets the replacement permission standard, then the processor 31 proceeds to step S45. If the comparison score A does not meet the replacement permission standard, then the processor 31 ends the replacement process.

If the biometrics authentication apparatus 30 succeeds only in making a comparison between the biometric information (used this time) 73 and the second template 72, this prevents the biometrics authentication apparatus 30 from updating the second template 72 with the biometric information (used this time) 73 which is quite different from the first template 71. That is to say, the replacement permission standard is not a standard for determining whether or not a comparison between the biometric information (used this time) 73 and the first template 71 succeeds, but a standard on the basis of which the determination that a comparison between the biometric information (used this time) 73 and the first template 71 succeeds may be made.

(Step S45) The processor 31 calculates the comparison score B for the second template 72 and the biometric information (used this time) 73.

(Step S46) The processor 31 calculates the comparison score C for the first template 71 and the second template 72.

The processor 31 generates in this way the comparison scores A, B, and C for the combinations of two of the biometric information (used this time) 73, the first template 71, and the second template 72.

(Step S47) The processor 31 compares the comparison scores A, B, and C and determines whether or not the comparison score C is the poorest. If the comparison score C is the poorest, then the processor 31 proceeds to step S48. If the comparison score C is not the poorest, then the processor 31 ends the replacement process.

(Step S48) The processor 31 registers the biometric information (used this time) 73 as the second template 72.

(Step S49) The processor 31 registers posture information (used this time) corresponding to the biometric information (used this time) 73 as posture information corresponding to the second template 72, and ends the replacement process.

Six comparison examples are indicated in a comparison example table 80 (see FIG. 10). With comparison example "1", the comparison score A is "550", the comparison score B is "1300", and the comparison score C is "800", and the comparison score B is the poorest. Therefore, the second template 72 is not replaced. That is to say, the biometric information (used this time) 73 relates to the generation of the comparison score B which is the poorest, so the processor 31 determines that it is not proper to register the biometric information (used this time) 73 as the second template 72.

Furthermore, with comparison example "2", the comparison score A is "550", the comparison score B is "900", and the comparison score C is "1500", and the comparison score C is the poorest. Therefore, the second template 72 is replaced. That is to say, the biometric information (used this time) 73 does not relate to the generation of the comparison score C which is the poorest, so the processor 31 determines that it is proper to register the biometric information (used this time) 73 as the second template 72.

In addition, with comparison example "3", the comparison score A is "800", the comparison score B is "1300", and the comparison score C is "500", and the comparison score B is the poorest. Therefore, the second template 72 is not replaced. That is to say, the biometric information (used this time) 73 relates to the generation of the comparison score B which is the poorest, so the processor 31 determines that it is not proper to register the biometric information (used this time) 73 as the second template 72.

Moreover, with comparison example "4", the comparison score A is "1500", the comparison score B is "900", and the comparison score C is "500", and the comparison score A is the poorest. Therefore, the second template 72 is not replaced. That is to say, the biometric information (used this time) 73 relates to the generation of the comparison score A which is the poorest, so the processor 31 determines that it is not proper to register the biometric information (used this time) 73 as the second template 72.

Furthermore, with comparison example "5", the comparison score A is "800", the comparison score B is "500", and the comparison score C is "1500", and the comparison score C is the poorest. Therefore, the second template 72 is replaced. That is to say, the biometric information (used this time) 73 does not relate to the generation of the comparison score C which is the poorest, so the processor 31 determines that it is proper to register the biometric information (used this time) 73 as the second template 72.

In addition, with comparison example "6", the comparison score A is "1500", the comparison score B is "500", and the comparison score C is "800", and the comparison score A is the poorest. Therefore, the second template 72 is not replaced. That is to say, the biometric information (used this time) 7.3 relates to the generation of the comparison score A which is the poorest, so the processor 31 determines that it is not proper to register the biometric information (used this time) 73 as the second template 72.

A smaller comparison score is better and a larger comparison score is poorer. Whether a comparison score is good or poor depends on a comparison score generation algorithm, an evaluation method, or the like. Accordingly, if whether a comparison result is good or poor is determined, then it may be that a smaller comparison score will be poorer and that a larger comparison score will be better.

It is assumed that the replacement permission standard for the comparison score A described in step S44 is, for example, the comparison score "1800". Then the determination that the biometric information (used this time) 73 meets a replacement standard is made if the comparison score A for the first template 71 and the biometric information (used this time) 73 is lower than 1800. The determination that the biometric information (used this time) 73 does not meet the replacement standard is made if the comparison score A for the first template 71 and the biometric information (used this time) 73 is higher than or equal to 1800.

Figure 11:
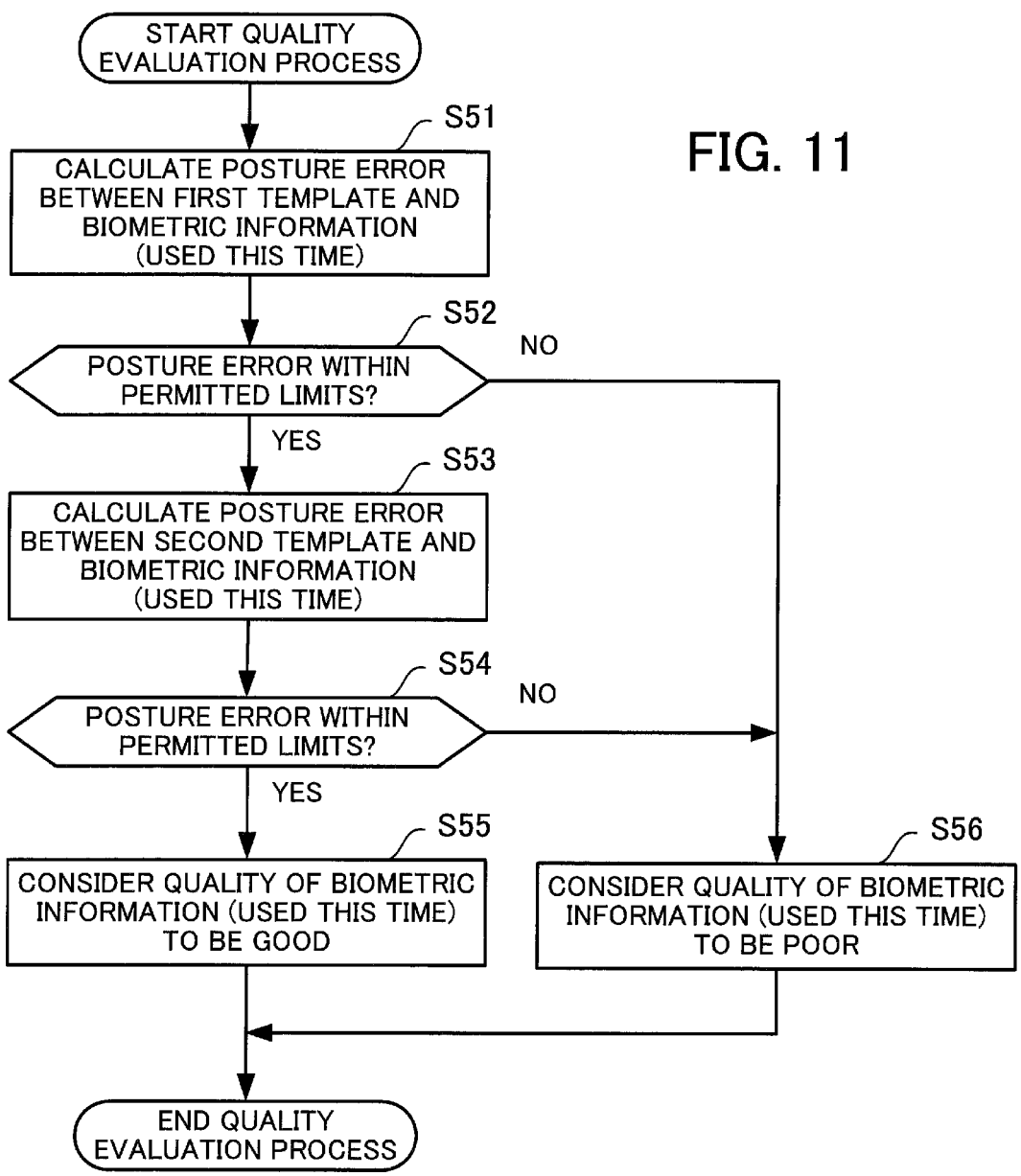
FIG. 11 is a flow chart of a quality evaluation process in the second embodiment.

The quality evaluation process in the second embodiment will now be described in detail with reference to FIG. 11. FIG. 11 is a flow chart of the quality evaluation process in the second embodiment.

The quality evaluation process is performed by the biometrics authentication apparatus 30. The quality evaluation process is performed for evaluating the quality of the biometric information (used this time) 73 by which the result of comparison match is obtained. Quality is an index for evaluating the uniformity of an environment in which a living body image is acquired. The quality includes a posture of a living body which is a subject, an environment in which a living body image is captured, and the like. The biometrics authentication apparatus 30 acquires as posture information a posture of a living body which is a subject, and evaluates the uniformity of an environment in which a living body image is acquired.

(Step S51) The processor 31 calculates a posture error between the first template 71 and the biometric information (used this time) 73. More specifically, the processor 31 acquires from the storage section 63 stored posture information corresponding to the first template 71. Furthermore, the processor 31 compares acquired posture information corresponding to the biometric information (used this time) 73 with the posture information corresponding to the first template 71 and calculates an error between them. By doing so, the biometrics authentication apparatus 30 is able to calculate a living body posture error between the first template 71 and the biometric information (used this time) 73 at living body image capture time.

(Step S52) The processor 31 determines whether or not the calculated posture error is within permitted limits determined in advance. If the calculated posture error is within the permitted limits determined in advance, then the processor 31 proceeds to step S53. If the calculated posture error is not within the permitted limits determined in advance, then the processor 31 proceeds to step S56.

If the difference in the tilt of a palm between the first template 71 and the biometric information (used this time) 73 at living body image capture time is, for example, 15 degrees or less, then the processor 31 determines that the calculated posture error is within the permitted limits. However, standards for determining whether or not a posture error is within permitted limits are not limited to one standard such as the tilt of a palm. A plurality of standards including forward, backward, leftward, and rightward positional deviations, distance, rotation, and deformation may be used.

(Step S53) The processor 31 calculates a posture error between the second template 72 and the biometric information (used this time) 73. More specifically, the processor 31 acquires from the storage section 63 stored posture information corresponding to the second template 72. Furthermore, the processor 31 compares acquired posture information corresponding to the biometric information (used this time) 73 with the posture information corresponding to the second template 72 and calculates an error between them. By doing so, the biometrics authentication apparatus 30 is able to calculate a living body posture error between the second template 72 and the biometric information (used this time) 73 at living body image capture time.

(Step S54) The processor 31 determines whether or not the calculated posture error is within permitted limits determined in advance. If the calculated posture error is within the permitted limits determined in advance, then the processor 31 proceeds to step S55. If the calculated posture error is not within the permitted limits determined in advance, then the processor 31 proceeds to step S56.

If the difference in the tilt of a palm between the second template 72 and the biometric information (used this time) 73 at living body image capture time is, for example, 10 degrees or less, then the processor 31 determines that the calculated posture error is within the permitted limits. However, standards for determining whether or not a posture error is within permitted limits are not limited to one standard such as the tilt of a palm. A plurality of standards including forward, backward, leftward, and rightward positional deviations, distance, rotation, and deformation may be used.

In addition, the permitted limits of the posture error between the second template 72 and the biometric information (used this time) 73 are narrower than the permitted limits of the posture error between the first template 71 and the biometric information (used this time) 73. However, the permitted limits of the posture error between the second template 72 and the biometric information (used this time) 73 may be wider than or equal to the permitted limits of the posture error between the first template 71 and the biometric information (used this time) 73. The biometrics authentication apparatus 30 makes the permitted limits of the posture error between the second template 72 and the biometric information (used this time) 73 narrower than the permitted limits of the posture error between the first template 71 and the biometric information (used this time) 73 to control accommodating a rapid change in biometric information for a person who is an object of authentication.

(Step S55) The posture error between the first template 71 and the biometric information (used this time) 73 is within the permitted limits determined in advance. In addition, the posture error between the second template 72 and the biometric information (used this time) 73 is within the permitted limits determined in advance. Therefore, the processor 31 determines that the quality of the biometric information (used this time) 73 is good, and ends the quality evaluation process.

(Step S56) At least one of the posture error between the first template 71 and the biometric information (used this time) 73 and the posture error between the second template 72 and the biometric information (used this time) 73 is not within the permitted limits determined in advance. Therefore, the processor 31 determines that the quality of the biometric information (used this time) 73 is poor, and ends the quality evaluation process.

As has been described, the biometrics authentication apparatus 30 evaluates the quality of the biometric information (used this time) 73. The biometrics authentication apparatus 30 evaluates the quality of the biometric information (used this time) 73 with respect to both of the first template 71 and the second template 72. However, the biometrics authentication apparatus 30 may evaluate the quality of the biometric information (used this time) 73 with respect to one of the first template 71 and the second template 72.

In addition, the biometrics authentication apparatus 30 evaluates the quality of the biometric information (used this time) 73 on the basis of the posture error between the first template 71 or the second template 72 and the biometric information (used this time) 73. However, the biometrics authentication apparatus 30 may evaluate the quality of the biometric information (used this time) 73 on the basis of an error between the position of a living body at the time of acquiring biometric information and a correct position.

Third Embodiment

Figure 12:
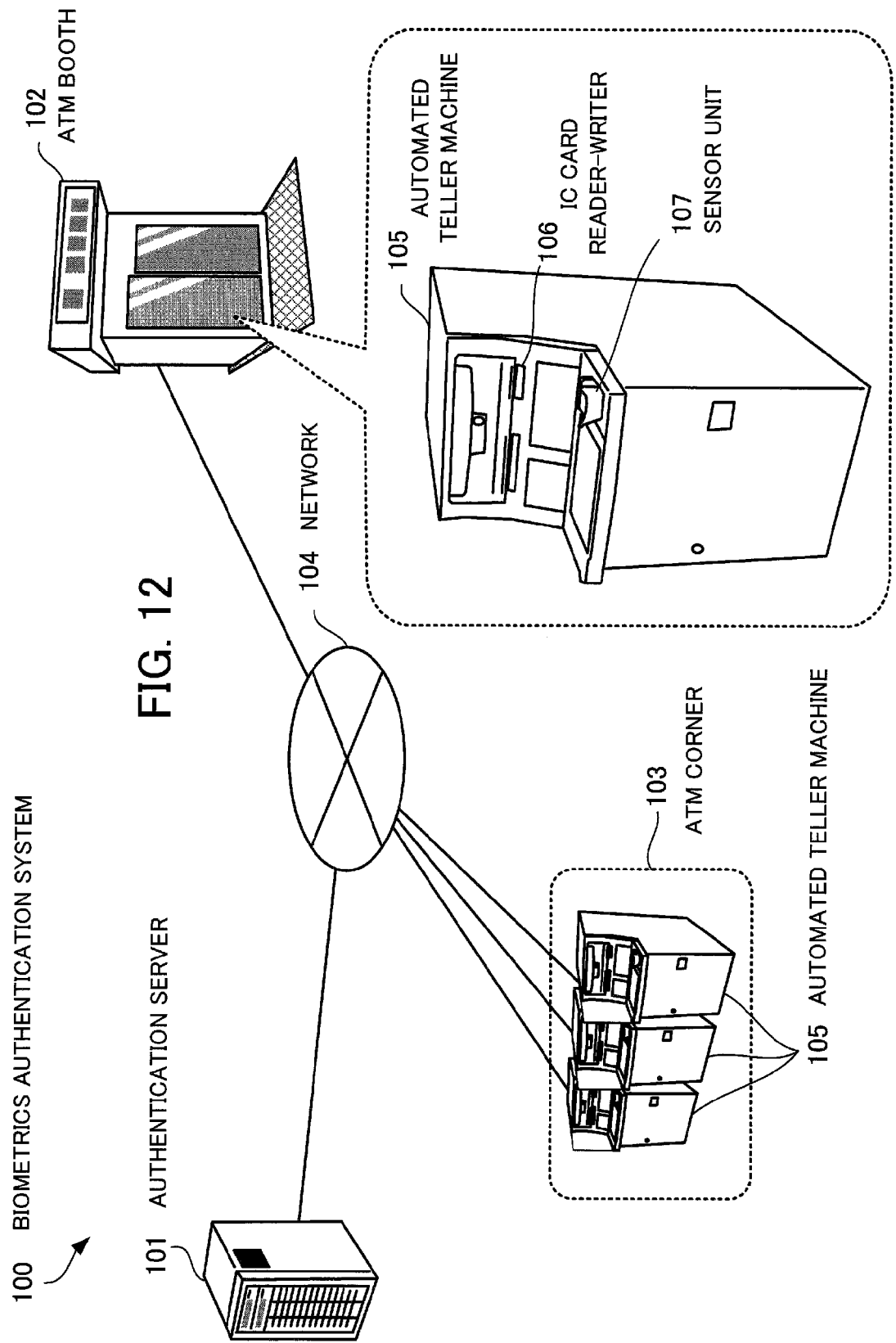
FIG. 12 illustrates the structure of a biometrics authentication system according to a third embodiment.

A biometrics authentication system in a financial institution will now be described by the use of a third embodiment. FIG. 12 illustrates the structure of a biometrics authentication system according to a third embodiment. Description of components in FIG. 12 which are the same as those in the second embodiment will be omitted.

In a third embodiment a biometrics authentication system 100 using palm veins for performing authentication is taken as an example. However, the same applies to a system which detects the characteristics of another part of a living body for performing authentication.

The biometrics authentication system 100 is one of systems which recognize the characteristics of a living body, which specify an individual, and which perform authentication, and is used in, for example, a banking system for performing customer authentication. The biometrics authentication system 100 includes a plurality of automated teller machines 105, an authentication server 101, and a network 104.

The authentication server 101 associates identification information for identifying an individual with a second template 72 registered before biometrics authentication, and stores them. Identification information for identifying an individual is a unique ID (IDentification) given directly (such as a user number) or indirectly (such as an account number) to a user.

One or more automated teller machines 105 are installed in an ATM corner 103 or an ATM booth 102 in a financial institution. The automated teller machine 105 is one of authentication apparatus which perform biometrics authentication before financial transactions at user authentication time. The automated teller machine 105 includes an IC card reader-writer 106 and a sensor unit 107. The sensor unit 107 includes an image capture device, captures an image of veins in a user's palm, and acquires biometric information (used this time) 73. The automated teller machine 105 performs user authentication by a first template 71 which the IC card reader-writer 106 acquires from an IC card (such as a cash card with a built-in IC chip) of the user and the biometric information (used this time) 73 acquired by the sensor unit 107.

As has been described, the biometrics authentication system 100 stores the first template 71 and the second template 72 in the different storage sections and manages them. The automated teller machine 105 has the same processing functions that the biometrics authentication apparatus 30 described in the second embodiment has. By doing so, the automated teller machine 105 functions as a biometrics authentication apparatus. Furthermore, the automated teller machine 105 and the authentication server 101 included in the biometrics authentication system 100 may cooperate to realize the same processing functions that the biometrics authentication apparatus 30 described in the second embodiment has. This biometrics authentication system 100 improves the accuracy of authentication in an authentication process.

The above processing functions may be realized with a computer. In that case, a program in which the contents of functions each apparatus should have are described is provided. By executing this program on the computer, the above processing functions are realized on the computer. This program may be recorded on a computer readable record medium (which may be a portable record medium). A computer readable record medium may be a magnetic recording device, an optical disk, a magneto-optical recording medium, a semiconductor memory, or the like. A magnetic recording device may be a hard disk drive (HDD), a flexible disk (FD), a magnetic tape, or the like. An optical disk may be a digital versatile disk (DVD), a DVD-RAM, a CD-ROM, a CD-R (Recordable)/RW (ReWritable), or the like. A magneto-optical recording medium may be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When the computer executes this program, it will store in its storage unit the program, for example, which is recorded on a portable record medium or which is transferred from the server computer. The computer then reads the program from its storage unit and performs processes in compliance with the program. The computer may also read the program directly from a portable record medium and perform processes in compliance with the program. Furthermore, each time the program is transferred from the server computer, the computer may perform processes in turn in compliance with the program it receives.

In the above embodiments the descriptions are given with a palm as an example of a part of a living body. However, any part of a living body may be used. For example, a part of a living body may be the sole of a foot, a finger, a toe, the back of a hand, the instep of a foot, a wrist, an arm, or the like.

Furthermore, if veins are used for authentication, then a part of a living body in which the veins are observed is used. In addition, if a part of a living body for which biometric information is acquired may be specified, this is favorable for authentication. If a part of a living body is a palm, a face, or the like, then the part may be specified from an acquired image.

Furthermore, biometric information used for authentication is not limited to veins. A fingerprint, a palm print, or the like may be used.

Various changes may be made in the above embodiments, unless they depart from the spirit of these embodiments.

According to the above biometrics authentication apparatus, biometrics authentication system, and biometrics authentication method, the accuracy of authentication is improved in an authentication process.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A biometrics authentication apparatus comprising:
    a memory that stores first registered information and second registered information, the first registered information being biometric information registered in advance with respect to a person who is an object of authentication, the second registered information being biometric information acquired from the person and registered in previous authentication; and
    a processor that performs a process including:
    generating a comparison score from at least one of the first registered information and the second registered information and current biometric information currently acquired from the person and authenticating the person by comparing the comparison score with a determined threshold;
    generating a comparison score for each of combinations of two of the current biometric information used for authenticating the person, the first registered information, and the second registered information and evaluating the comparison score generated for said each of the combinations; and
    replacing the second registered information with the current biometric information when both of a comparison score generated from the current biometric information and the first registered information and a comparison score generated from the current biometric information and the second registered information are better than a comparison score generated from the first registered information and the second registered information.

2. The biometrics authentication apparatus according to claim 1, wherein the evaluating the comparison score includes:
    evaluating quality of the current biometric information; and
    evaluating, at the time of the quality meeting a determined standard, the comparison score for said each combination.

3. The biometrics authentication apparatus according to claim 1, wherein:
    the memory further stores quality information for the biometric information registered as the first registered information at the time of acquiring the biometric information registered as the first registered information; and
    the evaluating the comparison score includes evaluating quality of the current biometric information by comparison with the quality information corresponding to the first registered information and evaluating, at the time of a comparison result being within a determined range, the comparison score for said each combination.

4. The biometrics authentication apparatus according to claim 3, wherein:
    the memory further stores quality information for the biometric information registered as the second registered information at the time of acquiring the biometric information registered as the second registered information; and
    evaluating the comparison score includes evaluating quality of the current biometric information by comparison with the quality information corresponding to the second registered information and evaluating, at the time of a comparison result being within a determined range, the comparison score for said each combination.

5. The biometrics authentication apparatus according to claim 1, wherein when authentication by the second registered information fails, the process further includes performing authentication by the use of the first registered information.

6. The biometrics authentication apparatus according to claim 1, wherein authentication by the first registered information fails, the process further includes performing authentication by the use of the second registered information.

7. A biometrics authentication system comprising:
    a biometric information acquisition apparatus which acquires biometric information from a person who is an object of authentication; and a biometric authentication apparatus, wherein the biometric authentication apparatus includes:

a memory that stores first registered information and second registered information, the first registered information being the biometric information registered in advance, the second registered information being the biometric information acquired and registered in previous authentication; and a processor that performs a process including:

generating a comparison score from at least one of the first registered information and the second registered information and current biometric information currently acquired by the biometric information acquisition apparatus and authenticating the person by comparing the comparison score with a determined threshold;

generating a comparison score for each of combinations of two of the current biometric information used for authenticating the person, the first registered information, and the second registered information and evaluating the comparison score generated for said each of the combinations; and replacing the second registered information with the current biometric information when both of a comparison score generated from the current biometric information and the first registered information and a comparison score generated from the current biometric information and the second registered information are better than a comparison score generated from the first registered information and the second registered information.

8. A biometrics authentication method comprising:

generating, by a computer, a comparison score from at least one of first registered information which is biometric information registered in advance with respect to a person who is an object of authentication and second registered information which is biometric information acquired from the person and registered in previous authentication and current biometric information currently acquired and authenticating the person by comparing the comparison score with a determined threshold;

generating, by the computer, a comparison score for each of combinations of two of the current biometric information used for authenticating the person, the first registered information, and the second registered information and evaluating the comparison score generated for said each of the combinations; and replacing, by the computer, the second registered information with the current biometric information when both of a comparison score generated from the current biometric information and the first registered information and a comparison score generated from the current biometric information and the second registered information are better than a comparison score generated from the first registered information and the second registered information.

* * * * *